United States Patent [19]
Kohle et al.

[11] Patent Number: 5,302,984
[45] Date of Patent: Apr. 12, 1994

[54] DEVICE FOR MOVING A SLIDE INTO A SLIDE GATE AND FOR RECEIVING A LENS MOUNT

[75] Inventors: Uwe Kohle, Esslingen; Ulrich Kowatsch, Leonberg, both of Fed. Rep. of Germany

[73] Assignee: Eastman Kodak Company, Rochester, N.Y.

[21] Appl. No.: 1,018

[22] Filed: Jan. 6, 1993

[30] Foreign Application Priority Data

Jan. 14, 1992 [DE] Fed. Rep. of Germany ....... 4200765

[51] Int. Cl.⁵ ............................................. G03B 23/00
[52] U.S. Cl. .................... 353/103; 353/116; 353/100
[58] Field of Search ............... 353/111, 103, 105, 106, 353/118, 112, 113, 115, 116

[56] References Cited

U.S. PATENT DOCUMENTS

| | | | |
|---|---|---|---|
| 3,542,464 | 11/1970 | Dimitracopoulos | 353/116 |
| 3,563,646 | 1/1969 | Harvey | 353/83 |
| 3,756,717 | 9/1973 | Badalich | 353/118 |
| 3,936,169 | 2/1976 | Barowski et al. | 353/115 |
| 4,309,087 | 4/1982 | Sylla et al. | 353/116 |

FOREIGN PATENT DOCUMENTS

| | | |
|---|---|---|
| 0288396 | 10/1988 | European Pat. Off. |
| 1732715 | 10/1956 | Fed. Rep. of Germany |
| 1766297 | 5/1958 | Fed. Rep. of Germany |
| 2345333 | 9/1981 | Fed. Rep. of Germany |
| 1272894 | of 1961 | France ...... 353/114 |

*Primary Examiner*—William A. Cuchlinski, Jr.
*Assistant Examiner*—William C. Dowling
*Attorney, Agent, or Firm*—Francis H. Boos

[57] ABSTRACT

In a device for moving a slide from a slide tray via a slide chute (3) into a slide gate, an integral component (1) is provided which includes the slide chute (3), a support means for a motor-driven cam (15) and support means for a slide lifter (22), slide pressure means (24, 26) and a tray release lever (16) adapted to arrest a slide tray as well as supporting guide means (6, 6a) for the tray release lever (16) and guides (8d, 8e) adapted to receive the lens mount.

7 Claims, 3 Drawing Sheets

DEVICE FOR MOVING A SLIDE INTO A SLIDE GATE AND FOR RECEIVING A LENS MOUNT

FIELD OF THE INVENTION

The invention relates to a device for moving a slide from a slide tray via a slide chute into a slide gate, said device consisting of a motor-driven cam for actuating a slide lifter, slide pressure means arranged in the area of the slide chute as well as guides for a lens mount.

BACKGROUND

DE-OS 2 345 333 discloses a device by means of which slides can be transported in the vertical direction out of a tray into their projection position and back into said tray. A vertical plate provided with a gate in the area of the projection raypath mounts a motor-driven cam for actuating both a slide changing means hinged to said plate and a carriage which is arranged on said plate and shiftable in the horizontal direction for aligning the slide in the slide gate.

This known device is disadvantageous in that the insertion of the plate complete with slide gate and slide changing means causes manufacturing problems and requires considerable adjustment work in order to arrange the plate exactly at right angles with the optical axis of the projection raypath in the projector housing.

In known slide projectors the lens mount and the holding means for the insertion of the slide positioning means are usually integrally formed. In the case of one of such slide projectors (DE-GM 1 732 715) the lens mount, the holding means for the slide positioning means and a support for the condenser lens system are designed as an integral assembly unit.

SUMMARY OF THE INVENTION

It is the object of the invention to design a device of the generic type which is uncomplicated, stable and space-saving and can be easily built into a projector.

According to the invention this object is attained in that the slide chute, the supports for the cam, the slide lifter and the slide pressure means as well as the guides for receiving the lens mount are all provided on one integral component.

According to an advantageous modification, an additional support means for a tray release lever, which is adapted to arrest the slide tray, as well as a supporting guide means for said lever are provided on said component.

According to a further advantageous modification the component consists of a rectangular vertical wall which defines an L with a plate projecting horizontally from the front side of said wall in the area of the slide chute. The slide chute, the supporting guide means and all support means are provided in the vertical wall.

According to a further advantageous modification the plate has a narrow section which extends in parallel with the front side of the wall and is provided with attachment holes, and a broad section which is located on the level of the slide chute and extends at right angles in the forward direction and includes guide means for the lens mount.

Further features and advantages can be inferred from the other subclaims as well as from the description of an embodiment of the invention illustrated in the drawing.

BRIEF DESCRIPTION OF THE DRAWINGS

The drawing shows perspectively in
FIG. 1 the subject matter of the invention without a lens mount.

DESCRIPTION OF THE PREFERRED EMBODIMENTS

Figure 1:
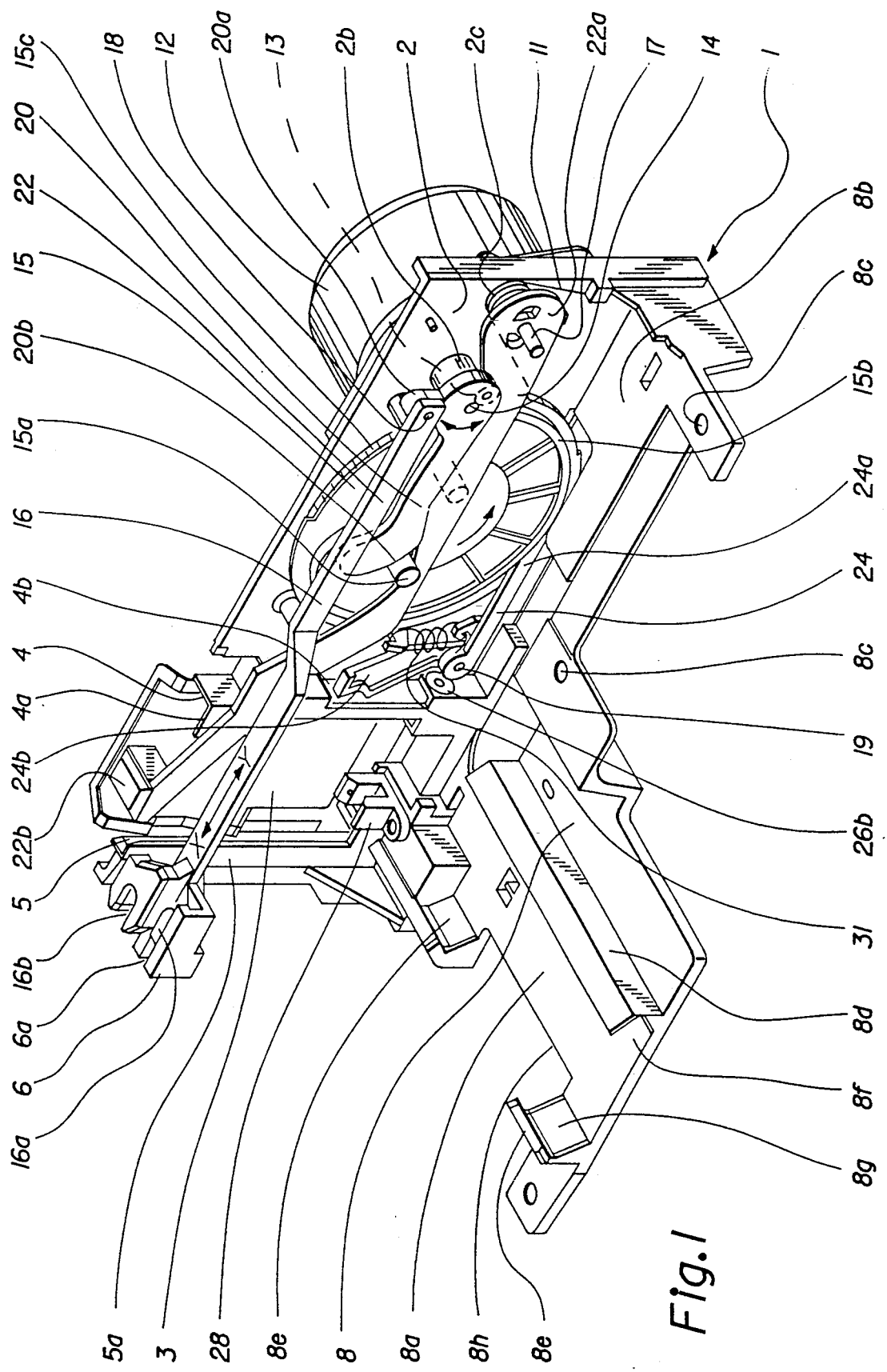

As can be seen in particular in FIG. 1, a component generally denoted 1 is composed of a rectangular vertical wall 2 and a plate 8 defining an L with said wall and projecting horizontally from the front side thereof. Component 1 can be made from die-cast aluminum or from plastic.

Figure 3:
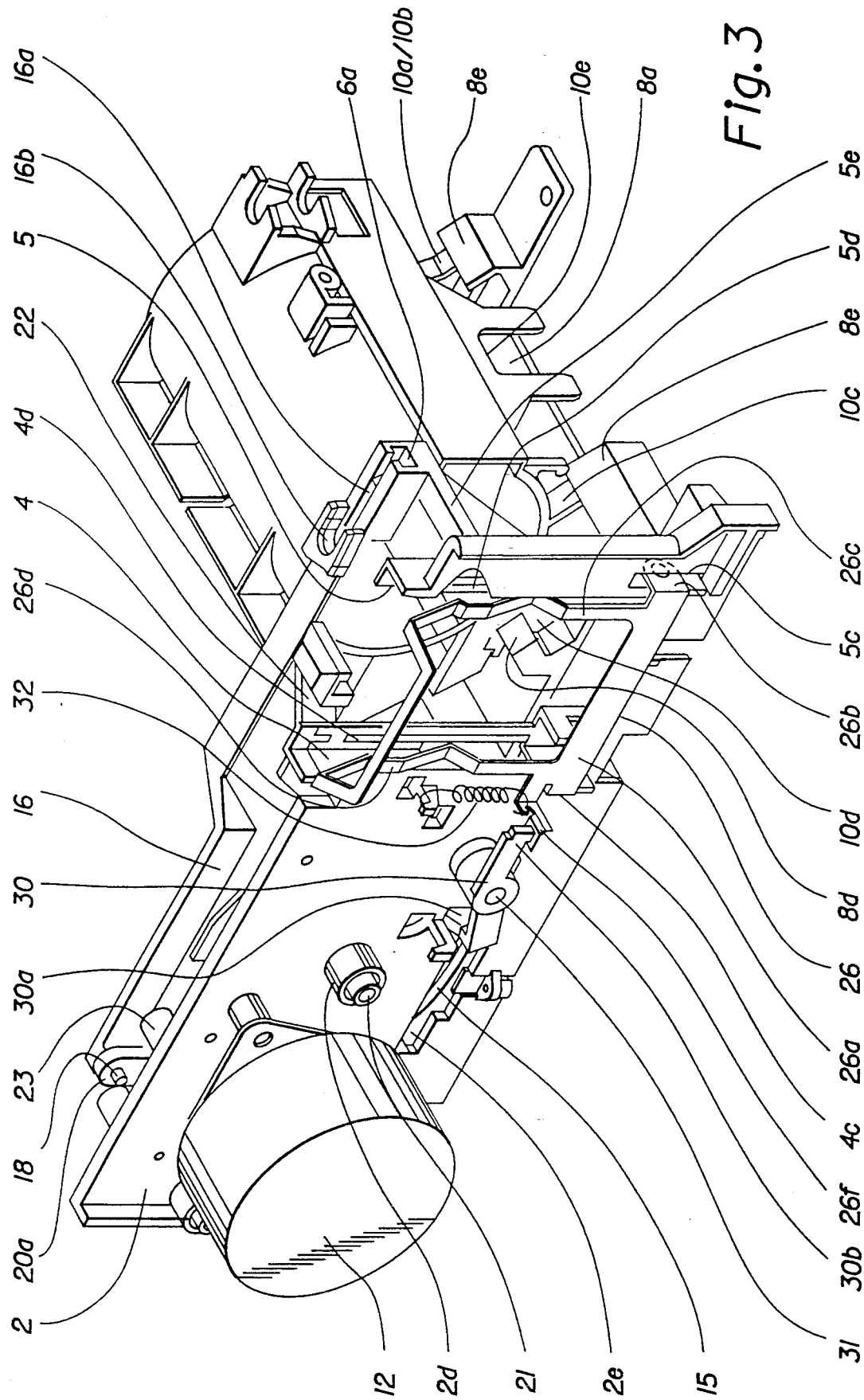
FIG. 3 a rear view of the subject matter of the invention according to FIG. 2.

Vertical wall 2 includes a U-shaped recess which is laterally offset and extends from the top to the bottom and with its side walls 4 and 5 defines a slide chute 3. The front edges of side walls 4 and 5 are bent off in the direction towards each other. The inner surface of each of the bent-off sections 4a and 5a features a semicircular web portion 4d and 5d respectively (FIG. 3). Moreover a plurality of support means designed as mounting eyelets are molded to the front side of wall 2, each being provided with a bore for mounting a journal.

On the rear side of wall 2, a motor 12 is mounted whose motor shaft (not illustrated) extends through wall 2 and carries at its end projecting from the front side of wall 2 a pinion 13 (FIG. 1). The pinion engages a toothed rim 15c of a cam 15 located at the front side of wall 2. Cam 15 together with its integral journal 21 is mounted for rotation in the bore of a mounting eyelet projecting from the rear side of wall 2 (FIG. 3).

A slide pressing lever 26 designed as a sheet metal frame can be pivoted into slide chute 3 from the rear side. Its two lateral webs 26c and 26d each have a V-shaped bend pointing in the direction of the bent-off portions 4a and 5a of the two side walls 4 and 5 of slide chute 3. The lower transverse web portion 26a of pressing lever 26 has a bent tongue on each of its left and right sides. The bent sections 26b of the tongues extend into recesses 4c and 5c provided adjacent to the side walls 4 and 5 of slide chute 3 in wall 2 and are plugged onto bolts which laterally extend into the recesses 4c and 5c (FIGS. 1 and 3).

Lateral web 26d of slide pressing lever 26 is provided with an offset tongue 26f on which a spring 32 is hooked which biases slide pressing lever 26.

A two-armed lever 30 which is biased clockwise is mounted about a journal 31. Its free lever end 30a extends through an opening 2e of wall 2 and senses a cam section (not illustrated) of cam 15 mounted on the front side of the wall. The other free lever end 30b exerts pressure on the offset tongue 26f on the lateral web 26d of slide pressing lever 26.

Figure 2:
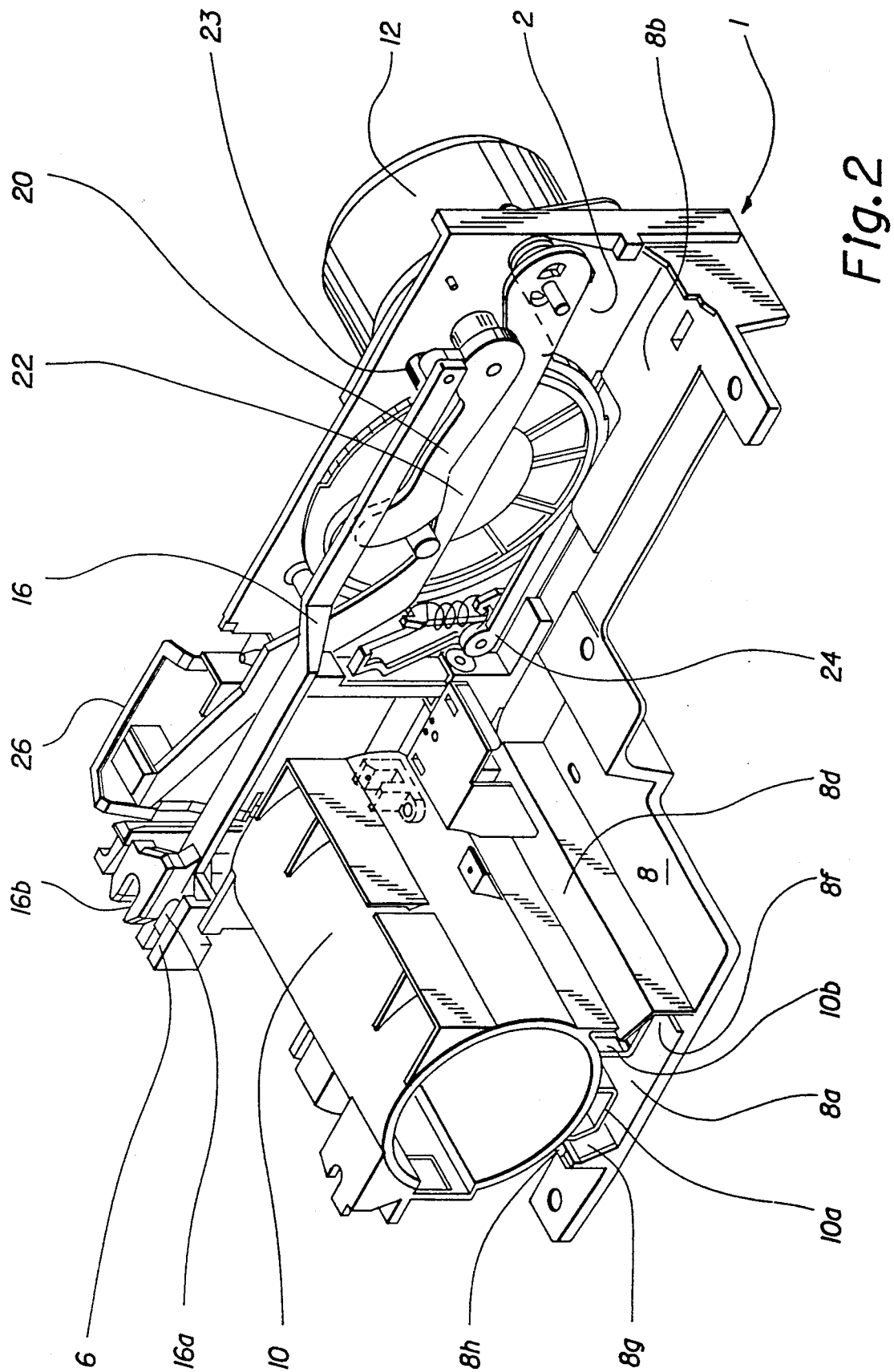
FIG. 2 the subject matter of the invention according to FIG. 1 including a lens mount.

As can be inferred from FIGS. 1 and 2, lateral wall 4 of slide chute 3 has a cut-out 4b through which a first lever arm 24b with two projections of a two-armed slide pressing lever 24 can be pivoted which is mounted for rotation about a pin 19 on the front side of wall 2. Its pivotal movement is controlled by a further cam section 15b of cam 15, which is sensed by the second lever arm 24a of slide pressing lever 24, said second lever arm 24a being held in contact with cam section 15b by a spring 31.

At the front side of wall 2, a mounting eyelet 2c is provided for mounting a slide lifter 22 which is pivotable about a pin 17. Slide lifter 22 is urged clockwise in the upward direction by a spring 11 to rest against a pin 15a eccentrically arranged on cam 15.

During a rotary movement of cam 15 by at least 90° slide lifter 22 is pivoted downwards from its upper initial position (FIGS. 1 and 2) by means of pin 15a. During further rotation of cam 15 slide lifter 22 is once again pivoted to its upper initial position as a result of its spring-biased contact with pin 15a.

Adjacent to side wall 5 of slide chute 3, a web 5e (FIG. 3) is provided which is integral with a supporting guide means 6. A tray release lever 16 is supported, and guided by means of a finger 16a projecting from its free end and provided with rounded lateral slide surfaces (not illustrated) for sliding movement in a guide groove 6a extending in parallel with the front side of wall 2 in supporting guide means 6.

An intermediate lever 20 spring-biased in the counterclockwise direction is mounted about a pin 14 also projecting from the front side of wall 2 and held in a mounting eyelet 2b. Intermediate lever 20 is also actuated by pin 15a which is eccentrically arranged on cam 15 and, upon rotation of cam 15 in the direction of the arrow, pivoted upwards in the clockwise direction in opposition to a spring not illustrated by means of pin 15a (shown in dash-dotted lines) such that tray release lever 16 which is hinged to a short bent-off portion 20a of intermediate lever 20 is retracted in the direction of the arrow "Y". Tray release lever 16 is once again moved forwardly in the direction of the arrow "X" when, during another rotation of cam 15, pin 15a slides across an arcuate section 20b of the free end of intermediate lever 20 which is biased counterclockwise. When, during further rotation of cam 15, pin 15a leaves the arcuate section 20b, the short bent-off portion 20a of intermediate lever 20 is moved by the spring not shown into contact with an abutment pin 23 protecting from the front side of wall 2 (FIGS. 2 and 3). In that abutment position of intermediate lever 20 tray release lever 16 assumes its most advanced position in the direction of the arrow "X".

Tray release lever 16 moreover features at its free end above finger 16a a fork-shaped end section 16b which in the most advanced position of tray release lever 16 in the direction of the arrow "X" engages one of the pins associated with each compartment of a slide tray. The tray is thus blocked.

As can be seen from FIG. 1, the aforementioned horizontal plate 8 comprises a narrow section 8b which extends in parallel with the front side of wall 2 and is provided with attachment holes 8c, and a broad section 8a, which is located on the level of slide chute 3 and extends forwardly at right angles thereto. A lens mount is provided on the latter. The lens mount consists of two webs 8d and 8e which are provided with prismatic guide elements 8f and 8g and arranged at right angles to the side walls 4 and 5 of slide chute 3. Web 8e is aligned with side wall 5 of the slide chute and interrupted by a recess 8h.

In the case of a lens mount 10 made from plastic and designed as a barrel, a first pair of supports 10a and 10b is molded to the front section, and a second pair of supports 10c and 10d to the rear section of the mount. The shape of the supports is adapted to the inclined surfaces of the prismatic guide elements 8f and 8g against which they rest resiliently and free from play.

A U-shaped recess 10e (FIG. 3) provided on the side of lens mount 10 is adapted to receive a disk (not illustrated) which is eccentrically seated on the motor shaft of a focusing motor.

The above-described control and actuating means function as follows:

When cam 15 is in its initial position in which its eccentrically arranged pin 15a is located substantially vertically above journal 21 of cam 15, all the other actuating and control means 16, 20, 22, 24, 26 and 30 are also in their initial positions. Slide lifter 22 spring-biased towards pin 15a from below is positioned with its free end provided with slide support 22b in its uppermost position in the area of the opening of the slide chute. In this position of pin 15a of cam 15 intermediate lever 20 also rests resiliently on pin 15a from above, its short bent-off portion 20a assuming a position in which the tray release lever 16 hinged to it is retracted in the direction of the arrow "Y". Moreover, the cam sections of cam 15, which is in its initial position, assume a position in which both the slide pressing lever 26, which can be actuated by the two-armed lever 30 (FIG. 3) and is located behind slide chute 3, and the slide pressing lever 24 (FIG. 1), which can be pivoted laterally into slide chute 3, are pivoted out of slide chute 3.

Through a passage slot provided above the opening of the slide chute in an arrested bottom plate of the slide tray whose compartment body can be moved across said arrested bottom plate, a slide is moved onto the slide support 22b of slide lifter 22.

While cam 15 carries out half a revolution intermediate lever 20, which rests against the eccentrically arranged pin 15a, is pivoted counterclockwise right at the beginning and tray release lever 16, which is hinged to bent-off portion 20a of intermediate lever 20, is shifted in the direction of the arrow "X" into its most advanced position in which its fork-shaped end portion 16b engages one of the pins associated with each slide compartment of the slide tray so that the compartment body of the slide tray previously transported across the bottom plate is now blocked.

After cam 15 has completed half a revolution slide lifter 22 resting against pin 15a reaches its lowermost position and the slide positioned on its slide support 22b is moved into a U-shaped slide support 28 at the bottom of slide chute 3, which is provided with a light barrier. Shortly before cam 15 has completed half its revolution slide pressing lever 24 controlled by cam section 15b is pivoted, lever arm 24b entering the slide chute in order to align the slide on the opposite side wall 5 of slide chute 3. Simultaneously the two-armed lever 30 (FIG. 3) is actuated by the cam section located on the rear side of cam 15 (not illustrated). The two-armed lever pivots slide pressing lever 26 in the direction of the slide, which by its V-shaped bends provided on the side webs 26c and 26d presses the slide forwardly against the semicircular webs 4d and 5d arranged on the inner surfaces of the bent-off portions 4a and 5a of the side walls 4 and 5.

After the slide has been projected cam 15 carries out the second half of its revolution during which pin 15a reaches once again its upper initial position. During the second rotary movement of cam 15 the two slide pressing levers 24 and 26 are also pivoted back to their initial positions by the cam sections moved along Moreover, pin 15a causes both slide lifter 22 to be moved upwards again and thus the slide to be returned to the empty compartment in the slide tray and the intermediate lever 20 to be pivoted clockwise and the tray release lever 16 to be retracted in the direction of the arrow "Y" so that the pin on the slide tray is disengaged and the tray is released for further transport.

We claim:

1. Slide projector apparatus adapted for moving a slide from a slide tray via a slide chute to a slide gate and having a motor-driven cam for actuating a slide lifter, slide pressure means arranged in the area of the slide chute and guides for a lens mount, said apparatus comprising:

an integral mounting component on which is provided said slide chute, support means for said cam, said slide lifter, said slide pressure means, said lens mount guides, support means for a tray release lever for arresting the slide tray and supporting guide means for said lever;

said integral mounting component being comprised of a rectangular vertical wall and a plate defining an L, said plate projecting horizontally from the front side of said integral component in an area of said slide chute, and in that said slide chute, said lever supporting guide means and said support means for the tray release lever, for said cam and for said slide lifter are provided in the vertical wall.

2. Apparatus according to claim 1, wherein said plate includes a narrow section extending in parallel with a front side of said wall and is provided with attachment holes, and a broad section, which is located on the level of slide chute, extends forwardly at right angles and includes the guides for the lens mount.

3. Apparatus according to claim 1, wherein said slide chute includes a slide passage opening and said supporting guide means are molded to said front side of said wall adjacent to said slide chute in the area of said slide passage opening.

4. Apparatus according to claim 1, wherein said tray release lever is hinged to an intermediate lever mounted on said wall and is movable by means of said cam and wherein said tray release lever is supported and shiftably guided in a guide groove of a supporting guide means by a finger projecting from a free end of the tray release lever.

5. Apparatus according to claim 4, wherein a fork-shaped end portion is provided above said finger, said portion engaging a pin associated with each compartment of a slide holding tray when said tray release lever is in an arresting position.

6. Apparatus according to claim 2, wherein said guides for the lens mount consist of two webs provided with prismatic guide elements, one of the webs being interrupted by a recess, and wherein the webs are aligned at right angles with side walls of said slide chute.

7. Apparatus according to claim 6, wherein said prismatic guide elements include inclined surfaces, said lens mount includes a front pair of elastic supports and a rear pair of elastic supports having outer contours conforming to and resting resiliently against said inclined surfaces of the prismatic guide elements.

* * * * *